E. CINQUINI.
SPRING LEAF SPREADER AND LUBRICATOR.
APPLICATION FILED SEPT. 13, 1921.
1,403,589.
Patented Jan. 17, 1922.
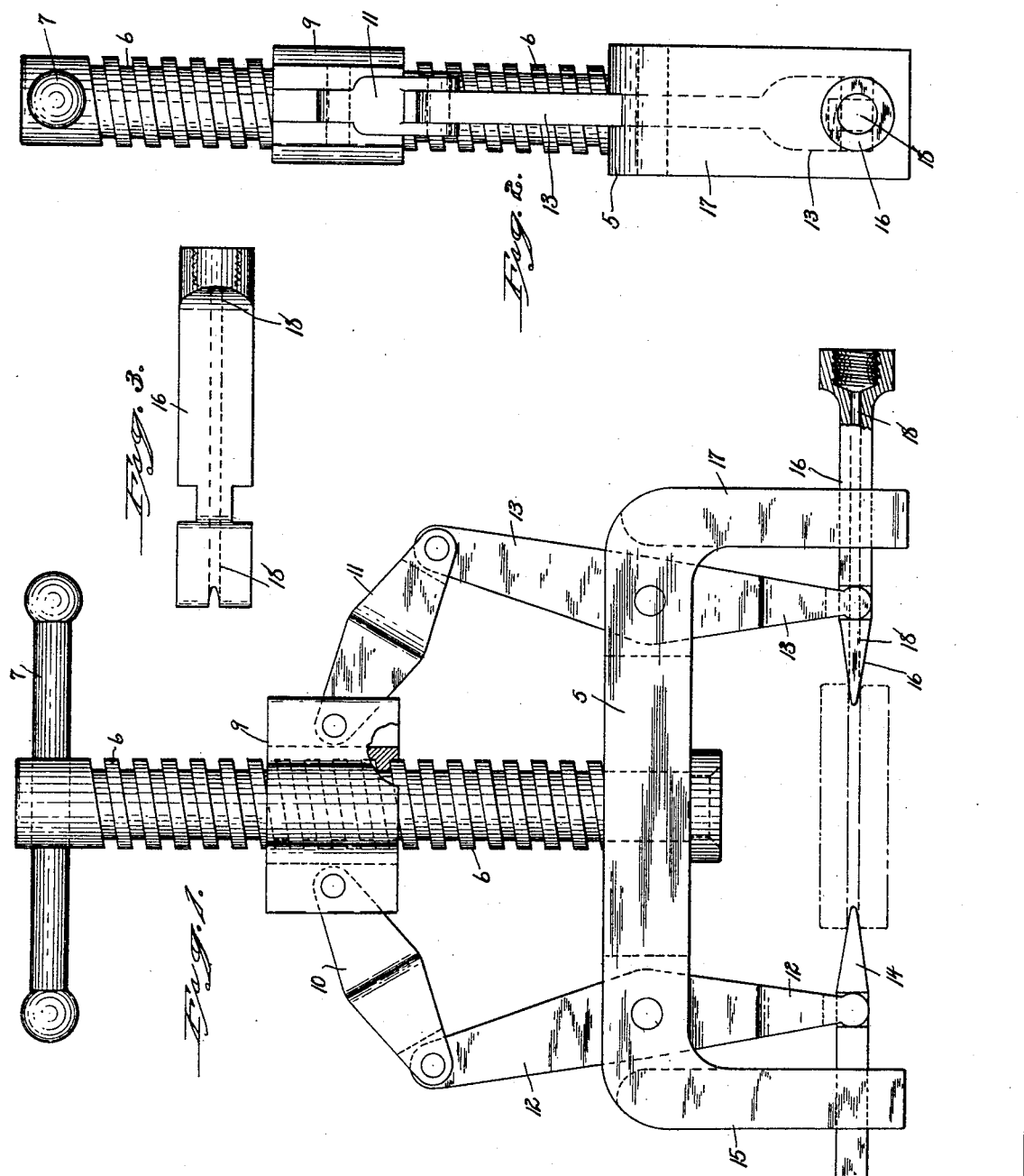

UNITED STATES PATENT OFFICE.

EGISTO CINQUINI, OF NEW HAVEN, CONNECTICUT.

SPRING-LEAF SPREADER AND LUBRICATOR.

1,403,589.    Specification of Letters Patent.    Patented Jan. 17, 1922.

Application filed September 13, 1921. Serial No. 500,405.

*To all whom it may concern:*

Be it known that I, EGISTO CINQUINI, a citizen of the United States, residing at New Haven, in the county of New Haven and State of Connecticut, have invented a new and useful Improvement in Spring-Leaf Spreaders and Lubricators; and I do hereby declare the following, when taken in connection with the accompanying drawings and the characters of reference marked thereon, to be a full, clear, and exact description of the same, and which said drawings constitute part of this application, and represent, in—

Fig. 1 A plan view of a spring-leaf spreader and lubricator constructed in accordance with my invention.

Fig. 2 A side view of the same.

Fig. 3 A plan view of the greasing-wedge detached.

This invention relates to improvement in spring-leaf spreaders and lubricators. In lubricating leaf-springs it is necessary to forcibly separate the leaves and then inject lubricating material between them. This is a difficult operation, although various devices have been produced for separating the springs.

The object of this invention is to provide a device by which the springs may be easily separated and which device will include, as a part of the structure, a grease-pump, through which grease may be injected between the leaves of a spring, and the invention consists in the construction as will be hereinafter described and particularly recited in the claim.

In carrying out my invention, I employ a yoke 5, in the center of which is swiveled a screw 6 provided at its outer end with a handle 7. On this screw is a nut 9 and pivotally connected with opposite sides of the nut are links 10 and 11 pivotally connected to the outer ends of levers 12 and 13, which are pivotally mounted in the yoke 5. The inner end of the lever 12 is swiveled with a wedge 14 adapted to slide in the arm 15 of the yoke, while the lever 13 is swiveled to a wedge 16 slidably mounted in the arm 17 of the yoke. The wedge 16 is provided with a longitudinal passage 18 opening through the point of the wedge, and this wedge is adapted to be connected with a grease-pump of usual construction.

In using the device, the wedges are placed on opposite sides of the springs, between adjacent leaves, and the handle 7 turned so as to rotate the screw 6 and move the nut 9 inward, which forces the wedges between the spring-leaves. When the leaves have been sufficiently separated, grease is introduced through the wedge 16 and injected between the leaves.

I thus provide, in a very simple manner, a spring-leaf spreader and, at the same time provide means by which springs may be readily lubricated.

I claim:

A spring-leaf spreader and lubricator, comprising a yoke formed with arms, a screw swiveled to the yoke, and provided at its outer end with a handle, a nut on said screw, links pivotally connected with said nut, levers pivotally connected with said yoke and with said links, and wedges mounted in the arms of the yoke and respectively connected with the ends of said levers, one of said wedges formed with a longitudinal passage through which grease may be ejected.

In testimony whereof, I have signed this specification in the presence of two subscribing witnesses.

EGISTO CINQUINI.

Witnesses:
WILLIAM J. VERDI,
JOHN J. CUCURELLO.